United States Patent
Farrelly

(10) Patent No.: US 9,701,336 B2
(45) Date of Patent: Jul. 11, 2017

(54) ELECTRICAL POWER ASSISTED STEERING SYSTEM

(71) Applicant: TRW Limited, Solihull, West Midlands (GB)

(72) Inventor: James Patrick Farrelly, Kenilworth (GB)

(73) Assignee: TRW Limited, Solihull, West Midlands (GB)

( * ) Notice: Subject to any disclaimer, the term of this patent is extended or adjusted under 35 U.S.C. 154(b) by 82 days.

(21) Appl. No.: 15/028,099

(22) PCT Filed: Oct. 8, 2014

(86) PCT No.: PCT/GB2014/053034
§ 371 (c)(1),
(2) Date: Apr. 8, 2016

(87) PCT Pub. No.: WO2015/052518
PCT Pub. Date: Apr. 16, 2015

(65) Prior Publication Data
US 2016/0251027 A1 Sep. 1, 2016

(30) Foreign Application Priority Data
Oct. 8, 2013 (GB) .................................. 1317766.2

(51) Int. Cl.
*B62D 5/04* (2006.01)
(52) U.S. Cl.
CPC .................................. *B62D 5/0463* (2013.01)
(58) Field of Classification Search
CPC .................................................. B62D 5/0463
(Continued)

(56) References Cited

U.S. PATENT DOCUMENTS

| 4,951,199 A | 8/1990 | Whitehead |
| 2001/0017229 A1 | 8/2001 | Kada et al. |

(Continued)

FOREIGN PATENT DOCUMENTS

| DE | 102011121611 A1 | 9/2012 |
| JP | 2004359129 A | 12/2004 |

OTHER PUBLICATIONS

Patents Act 1977: Search Report under Section 17, Application No. GB1317766.2 dated Apr. 15, 2014.
(Continued)

*Primary Examiner* — McDieunel Marc
*Assistant Examiner* — James E Stroud
(74) *Attorney, Agent, or Firm* — MacMillan, Sobanski & Todd, LLC

(57) ABSTRACT

An electric power assisted steering apparatus comprises an electric motor operatively connected to the steering mechanism; a torque signal generator adapted to produce a torque signal indicative of the torque carried by a portion of the steering mechanism, a column position signal generator for producing a column position signal indicative of the angular position of the steering wheel or steering column and a signal processing unit adapted to receive the signals produced by the sensing means and to produce therefrom a torque demand signal representative of a torque to be applied to the steering mechanism by the motor. The signal processing means includes: a first signal processing circuit which outputs an assistance torque signal, a second signal processing circuit which in use applies an additional offset torque to at least one of the input signal and the output signal of the first processing circuit in the event that the steering wheel of the vehicle is moving back towards a center position following a period of movement of the steering wheel away from the center position, the additional offset (Continued)

torque being reduced or not being applied in the event that the steering wheel moves away from the center position; and torque demand signal generating circuit adapted to produce the torque demand signal from the assistance torque signal.

10 Claims, 4 Drawing Sheets

(58) Field of Classification Search
USPC .......................................................... 701/41
See application file for complete search history.

(56) References Cited

U.S. PATENT DOCUMENTS

| | | |
|---|---|---|
| 2005/0236896 A1 | 10/2005 | Offerle et al. |
| 2006/0142922 A1 | 6/2006 | Ozaki et al. |
| 2007/0029129 A1 | 2/2007 | Shiozawa et al. |
| 2010/0145575 A1* | 6/2010 | Switkes ............... B62D 15/025 701/41 |
| 2011/0264321 A1* | 10/2011 | Offerle .................... B62D 5/06 701/31.4 |
| 2011/0303478 A1* | 12/2011 | Ellis ..................... B62D 5/0457 180/443 |
| 2013/0228033 A1* | 9/2013 | Watanabe .............. B62D 1/184 74/493 |
| 2015/0020639 A1* | 1/2015 | Kornmayer .............. F16D 3/76 74/493 |
| 2016/0325795 A1* | 11/2016 | Matsumoto ........... B62D 65/00 |

OTHER PUBLICATIONS

International Search Report and the Written Opinion, Application No. PCT/GB2014/053034 filed Oct. 8, 2014, filed Jan. 22, 2015.

* cited by examiner

ELECTRICAL POWER ASSISTED STEERING SYSTEM

CROSS-REFERENCE TO RELATED APPLICATIONS

This application is a national stage of International Application No. PCT/GB2014/053034, filed Oct. 8, 2014, the disclosures of which are incorporated herein by reference in entirety, and which claimed priority to Great Britain Patent Application No. 1317766.2, filed Oct. 8, 2013, the disclosures of which are incorporated herein by reference in entirety.

BACKGROUND OF THE INVENTION

This invention relates to electrical power assisted steering systems of the kind in which an electrical motor is adapted to apply an assistance torque to a steering component such as a steering column so as to reduce the driver effort required to control the vehicle.

In a simple electric power assisted steering system a torque sensor is provided which is arranged so that the level of torque in a steering column is measured. From this measurement a controller calculates the value of a torque demand signal that is indicative of the torque that is to be generated by an electric motor attached to the steering column. The motor applies a torque to the column of the same sense as that demanded by the driver and thus reduces the effort needed to turn the wheel.

In a typical apparatus, the relationship between the steering column torque and the assistance torque is set by a boost curve. This is a mapping between the column torque and the assistance torque where for a given input torque a multiplier value is defined that determines an amount by which the input signal is multiplied. To apply a boost, the value of the multiplier for a given input torque will be not unitary, 1.0. For example, if the multiplier is 2.0 then the output assistance torque will be twice the measured torque, if it is 0.5 it will be half the measured column torque. Instead of a multiplier it is also possible to define the relationship between input torque and assistance torque using a look up table, or in any other convenient manner. The boost curve will then be hard coded into the look up table.

BRIEF SUMMARY OF THE INVENTION

In accordance with a first aspect the invention provides an electric power assisted steering system comprising a steering mechanism which operatively connects a steering wheel to the road wheels of the vehicle, the steering wheel having a centre position corresponding to a movement of the vehicle straight ahead, an electric motor operatively connected to the steering mechanism; a torque signal generator adapted to produce a torque signal indicative of the torque carried by a portion of the steering mechanism, a column position signal generator for producing a column position signal indicative of the angular position of the steering wheel or steering column and a signal processing unit adapted to receive the signals produced by the sensing means and to produce therefrom a torque demand signal representative of a torque to be applied to the steering mechanism by the motor, in which the signal processing means includes:

a first signal processing circuit which receives an input signal dependent on the torque signal and outputs an assistance torque signal, the relationship between the input and the output of the first signal processing circuit being defined by a boost curve, a second signal processing circuit which in use provides an additional offset torque to at least one of the input signal and the output signal of the first processing circuit in the event that the steering wheel of the vehicle is moving back towards the centre position following a period of movement of the steering wheel away from the centre position, the additional offset torque being reduced or not being applied in the event that steering wheel moves away from the centre position; and torque demand signal generating circuit adapted to process the assistance torque signal to produce the torque demand signal.

The invention therefore applies an additional amount of assistance torque from the motor corresponding to a defined movement of the steering wheel. The applicant has appreciated that such a defined range is a reliable indicator of the driver having entered a constant radius bend. The initial movement away from the centre corresponds to the wheel loading up on entering the bend, and the movement back towards the centre occurs as the driver relaxes the force they apply to the wheel having felt the steering load up. In practice, this return will be over a very small angle of 1 or 2 degrees of column angle or less, but it happens with nearly all drivers on a constant corner although they will not consciously be aware of it.

The additional offset or "holding" torque helps the driver to "hold" the corner, reducing the amount of torque they need to apply in order to counter the torsional forces applied to the steering from the movement of the vehicle around the corner. In practice, by applying this after the driver has settled into the corner (as indicated by their relaxing a little the steering angle that they apply) it will go largely unnoticed by the driver. It does not, therefore, corrupt the feel of the steering on loading up when entering the corner, reducing the effort needed from the driver yet preserving good steering feel.

The signal processing means may be adapted to detect the transition from the steering moving back towards centre to moving away from centre, and may reduce the offset torque as the steering moves away from centre until it reaches zero, thereafter applying zero offset torque as the steering moves further from centre.

It may be reduced linearly.

The signal processing may also be adapted to detect the transition from the steering moving away from the centre to moving back towards the centre, and may increase the offset torque linearly as the steering moves back towards the centre until it reaches the mapped offset torque value, thereafter following the torque map as the steering moves further back towards the centre.

It may be increased linearly. It may be increased at an equal and opposite rate to that in which it is decreased as the steering moves back away from centre.

If the steering column does not move far enough to reach the map, when moving back to centre, or for the offset torque to reach zero, then the offset torque defined by the ramp will continue to be used until such time as the steering has moved.

The ramp may be independent of vehicle speed and independent of column torque. The amount of offset applied may also be independent of column torque measured by the torque sensor.

Therefore, the signal processing circuit may gradually ramps the offset torque in and out as a function of angle of the steering. This provides a highly repeatable feel to the steering.

The signal processing means detects a change in direction of movement of the steering, and may do so by storing values of steering position at defined time intervals and comparing a current value with a previous value.

The first signal processing means may use a boost curve which comprises a mapping of desired assistance torque against input signal value, the gain increasing linearly, or non-linearly, with an increase in input signal value. The input signal value will typically be the column torque or the column torque plus the additional torque amount value where appropriate. The assistance torque produced by the apparatus will either be the value output from the boost curve, or that value plus any additional offset torque applied to the output of the boost curve. Of course, further processing of the signals may be provided to achieve the final assistance torque value.

Where the additional amount of holding or offset torque is applied before the boost curve, this will increase the value of the input signal applied to the boost curve, and the increased input signal will then be boosted by the boost curve. In effect the boost curve "sees a higher column torque" then there really is, and acts as if the driver had applied a high torque to the column than they really have, giving more assistance.

Where the additional offset torque is applied after the boost curve, the additional torque increases the value of the signal output from the boost curve to produce a modified assistance torque signal that is used to produce the motor torque demand signal. In each case, the net effect is an increase in the value of the torque applied by the motor for a given torque applied by the driver and hence a reduction in the amount of torque that the driver needs to apply to hold the wheel in the corner.

The second processing means may also be adapted to apply an amount of offset torque to the input signal or the output signal or to both, and in each case the amount applied may be a function of the value of the angular position signal. By this we mean that it may vary with column position. It may apply different amounts of offset torque to the input and output signal to and from the boost curve. In each case, the offset may be applied additively to the torque signals.

The second signal processing may apply the additional offset torque to the input signal only, to the output only, or to both the input and output signals.

Where it is applied to the boost curve input signal and output signal the amount of additional torque applied to each may be scheduled so that at low vehicle speeds relatively more offset torque is applied to the input signal and less of the output to achieve a given increase in the assistance torque, and at higher speed relatively more offset torque is added to the output and less to the input to achieve the same given increase in the assistance torque.

The apparatus may therefore include a vehicle speed sensor which produces an output indicative of the velocity of the vehicle, and the second signal processing circuit may be arranged to receive the velocity signal and apply an additional boost to the input of output or both that is a function of the value of the velocity signal.

The second processing means may apply additional holding torque to the input of the boost curve below a threshold speed but not to the output of the boost curve, and may switch to apply additional holding torque to the output of the boost curve above the threshold but not to the input above the threshold.

The applicant has found that applying the additional torque at the input at low speeds is beneficial in some instances as it is a minimal effect on the ability of the steering to return to centre, especially where the boost curve has a dead band close to the centre position. On the other hand, they have found that applying the boost to the output can be beneficial at higher vehicle speeds as it may improve the linearity of the return characteristic which is of more importance at higher vehicle speeds.

The second processing circuit may determine the magnitude of the additional offset torque to be added to the input (or output) according to a predefined map of steering angular position against offset torque.

The second signal processing means may only apply the additional torque once the steering has been moved away from centre by at least a set amount, creating a dead band around the centre position at which no additional torque will be applied regardless of the direction of movement of the steering wheel. Alternatively, the amount may continuously over a defined range of angles. This gives yet more confidence that the driver has entered a curve and that the hold assistance is appropriate.

The assistance torque signal may be subject to further processing by the signal processing means to provide an overall assistance torque signal which is used to generate the torque demand signal. Typically the apparatus will generate the torque demand signal by combining the assistance torque signal with one or more additional torque components (e.g. damping, self-centering).

The torque signal generator may comprise a single sensor which is connected to the steering column or another mechanical component attached to it.

The apparatus may include an area of electronic memory in which the function defining the scaling factors or boost curves, and/or any look-up tables are stored.

The signal processing unit may be implemented by a processor that executes program instructions stored in an area of memory. The instructions may cause the processor to perform a number of distinct steps or functions, which define the different sub-units of the signal processing unit. However, it may be possible to implement the signal processing unit using discrete electronic components such as digital logic gates, a group of logic gates forming each sub-unit.

The apparatus may include a motor drive circuit which receives the torque demand signal and applies appropriate signals to a motor drive stage to cause the motor to output the demanded torque. This drive stage will typically comprise a bridge circuit.

According to a second aspect there is provided a method of operating an electric power assisted steering system, the method comprising the steps of:

generating a torque signal indicative of the torque carried by a portion of the steering mechanism, generating a column position signal indicative of the angular position of the steering wheel or steering column, producing from the signals an assistance torque signal that comprises a component part of a torque demand signal representative of a torque to be applied to the steering mechanism by the motor by the steps of:

processing an input signal dependent on the torque signal using a boost curve which defines a relationship between the input signal and an output signal; and applying an additional offset torque to at least one of the input signal and the output signal in the event that the steering wheel of the vehicle is moving back towards the centre position following a period of movement of the steering wheel away from the centre position, the additional offset torque being reduced or not applied in the event that the steering subsequently starts to move away from the centre position.

The method may comprise applying an offset torque to both the input signal and to the output signal. This may comprise adding an additional torque to the input or output signal or multiplying the input or output signal by a gain that is greater than 1.0.

Other advantages of this invention will become apparent to those skilled in the art from the following detailed description of the preferred embodiments, when read in light of the accompanying drawings.

DETAILED DESCRIPTION OF THE INVENTION

Figure 1:
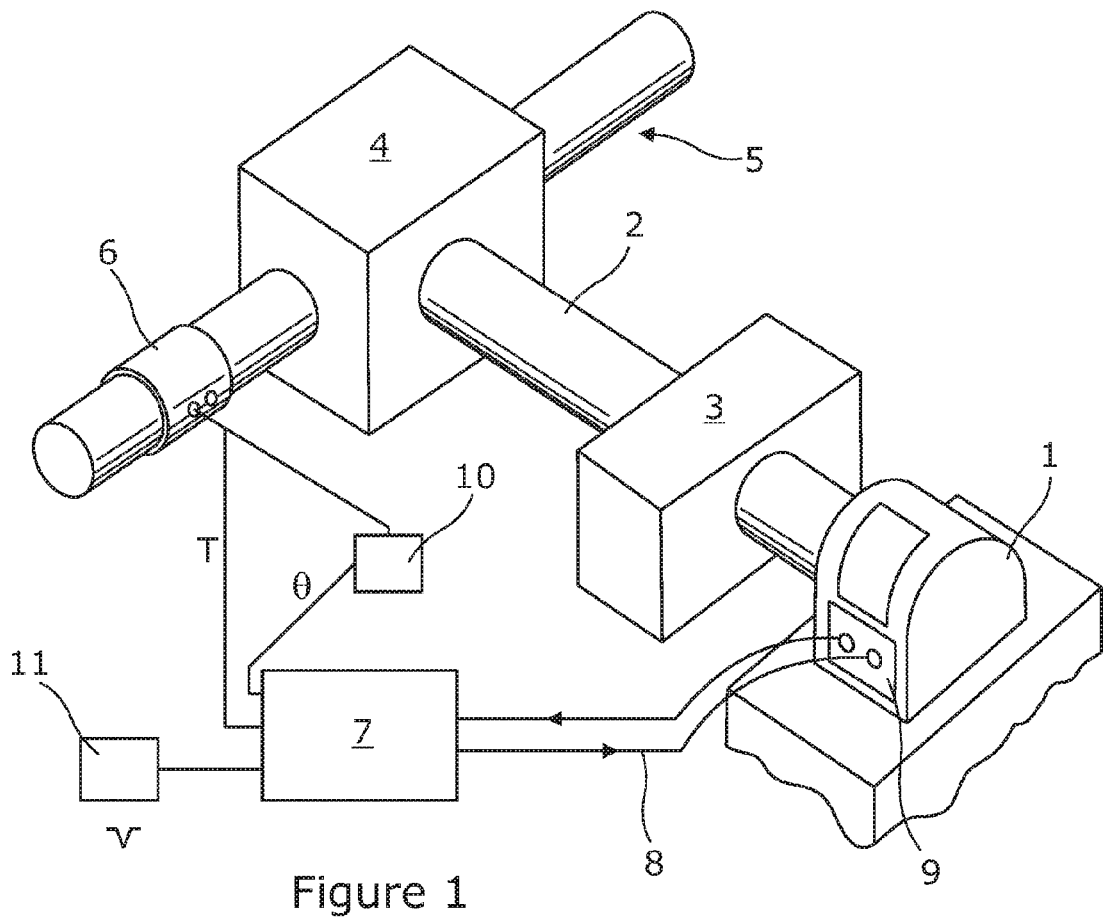
FIG. 1 is a schematic diagram of an electric power assisted steering system in accordance with the present invention.

A typical electric power assisted steering system is illustrated in FIG. 1 of the accompanying drawings. The system comprises an electric motor 1 which acts upon a drive shaft 2 through an (optional) gearbox 3. The drive shaft 2 terminates with a worm gear 4 that co-operates with a wheel provided on a portion of a steering column 5 or a shaft operatively connected to the steering column. For instance the motor may act upon a steering rack of the steering system. Of course, this is not to be taken as limiting to the scope of protection we are seeking, and other power assisted steering systems are envisaged to which the invention has application.

The steering column 5 carries a torque sensor 6 that is adapted to measure the torque Tcol carried by the steering column that is produced by the driver of the vehicle as the steering wheel (not shown) and hence steering column is turned against the resisting force provided by the vehicles road wheels (also not shown). The output signal Tcol from the torque sensor 6 is fed to a first input of a signal processing unit 7.

An angular position sensor 10 is also provided on the steering column shaft. As shown in FIG. 1 this is couple to the torque sensor 6 because it measures the position by monitoring the signal output from the torque sensor. This produces an output signal indicative of the angular position Ncol of the steering column. The output from the position sensor, Ncol is fed to a second input of the signal processing unit 7. This may comprise an electronic processor unit or other electronic circuitry.

A vehicle speed sensor 11 is also provided which produces an output signal indicative of the velocity of the vehicle.

In total three input values are passed to the signal processing unit: column position Ncol, vehicle speed V and column torque Tcol.

The signal processing unit 7 acts upon the three input signals to produce, as its output, a torque demand signal 8 that is passed to a motor controller 9. The motor controller 9 converts the torque demand signal 8 into drive currents for the electric motor 1. To produce this demand signal the processing unit includes a number of sub-units, each of which performs a single processing step or a specific set of steps.

The value of the torque demand signal 8 corresponds to the amount of assistance torque to be applied to the steering column by the electric motor 1. The value will vary from a minimum value corresponding to maximum output torque for the motor in one sense, through zero torque when the demand signal is zero, to a maximum motor torque of the opposite sense.

Figure 2:
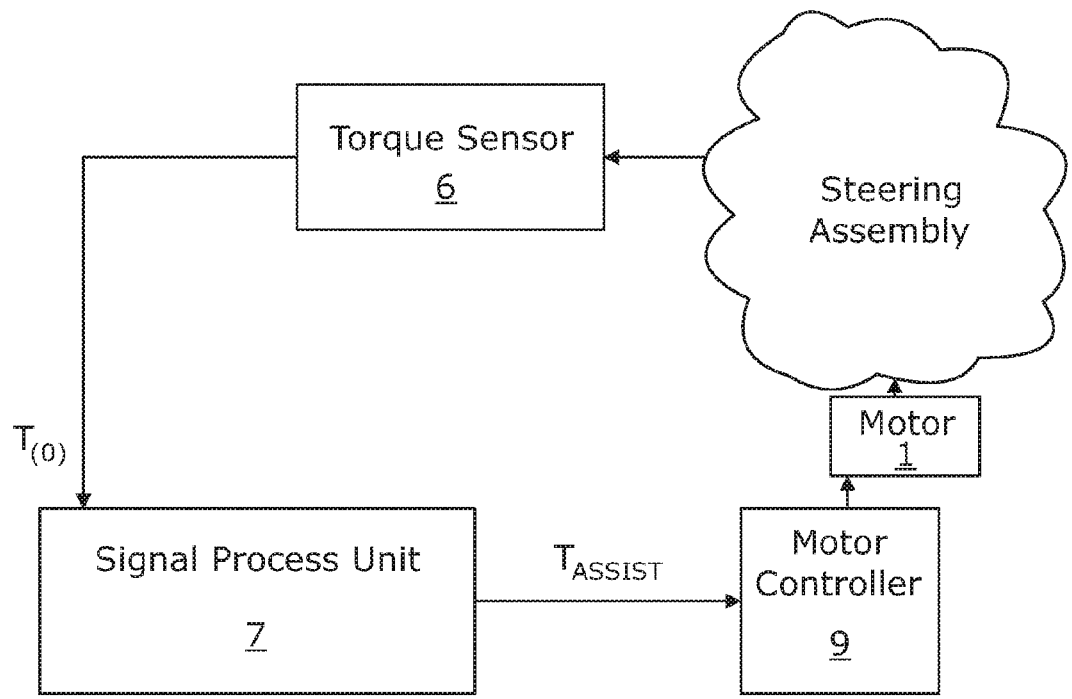
FIG. 2 is a block diagram representing the closed loop control of the motor in the system of FIG. 1.

The motor controller 9 receives as its input the torque demand signal and produces currents that are fed to the motor to reproduce the desired torque at the motor drive shaft 2. It is this assistance torque applied to the steering column shaft 5 that reduces the effort needed by the driver to turn the wheel. This forms a closed control loop as shown in FIG. 2.

The torque demand signal 8 is made up of at least two parts. The first is an assistance torque Tassist which depends on the amount of torque a driver is applying to the steering column through the wheel. The second part is an (optional) damping torque demand which is provided in order to improve the steering feel and/or enhance the safety of the system. Other torque demand signals can be used in addition, for example to help to counter the effects of cross winds on the vehicle which can cause it to stray from an intended path.

The assistance torque signal is derived as a function of the torque in the steering column as measured by the torque sensor 6. The relationship between the measured torque and the assistance signal is essentially linear. However, other possible relationships may be used to map the torque to the assistance signal. As is widely known in the art, the relationship between the input and output defines a boost curve. A typical boost curve is shown in Figure. As the measured torque increases the magnitude of the assistance signal generally increases. It will also be understood that the assistance torque signal may be dependent upon other parameters such as vehicle speed if required and the steering column position. In that case it is typical to reduce the value of the assistance torque signal at high speeds to enhance stability and increase it at very low speeds to ease parking manoeuvres.

Figure 3:
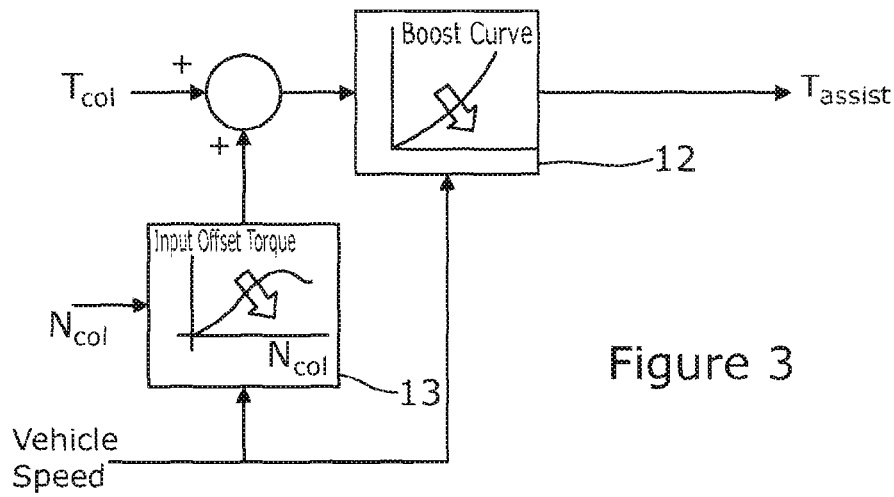
FIG. 3 is a block diagram illustrating the functional steps undertaken by an embodiment of a steering assembly in accordance with the first aspect of the invention to produce the assistance torque using the signal processing unit of the system of FIG. 1.

FIG. 3 shows schematically more detail of the signal processing means of the apparatus according to a first embodiment of the present invention. As can be seen the signal processing means 7 comprises a first signal processing circuit 12 which applies the boost curve to an input signal that is a function of the column torque. The output of this boost curve defines the assistance torque. In addition, it also includes a second processing circuit 13 that precedes the first circuit 12. The second circuit receives at an input the torque signal Tcol and modifies the torque signal under certain vehicle operating conditions to produce a modified torque signal that is fed into the boost curve of the first signal processing circuit.

Figure 6:
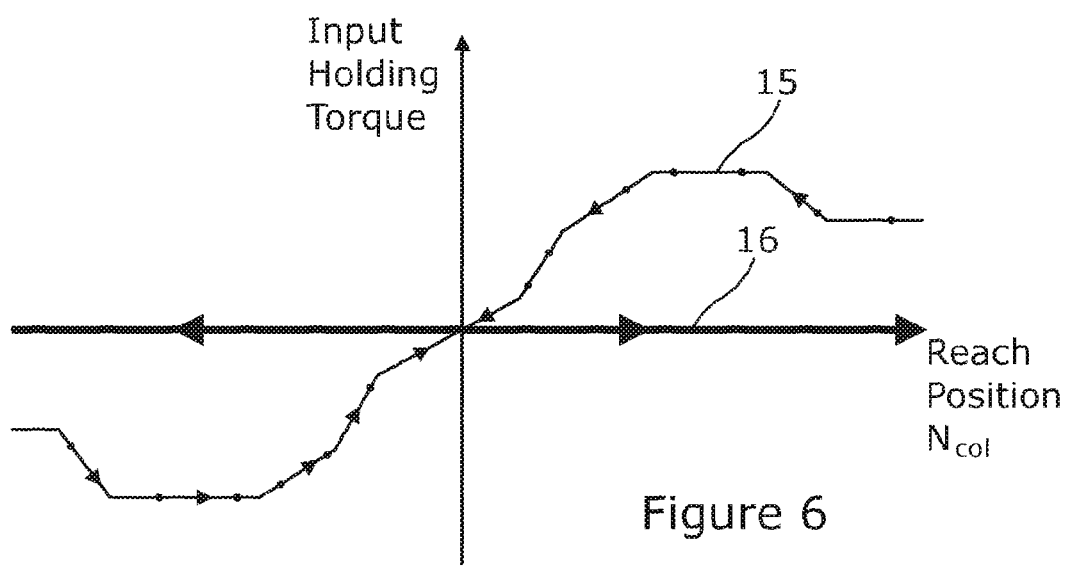
FIG. 6 is a map showing the relationship between the amount of additional offset torque applied to the input signal of the boost curve as the steering moves away from centre (solid line) and as it moves back to centre following an initial movement away (dotted line) of the embodiment of FIG. 3.

The second processing circuit 13 acts to apply an increase to the torque signal input to the boost curve in the event that vehicle has settled into a cornering manoeuvre as indicated by movement of the column away from centre followed by a small movement back towards the centre. The second processing monitors the position signal to determine that this condition is satisfied. When it is, the second processing circuit increases the input signal value by multiplying the input signal by a gain or by adding a set amount of extra torque. The gain or set amount of torque added is defined by a mapping between input torque and column position as shown in FIG. 6. Of course, other mappings are possible within the scope of this invention. The mapping shows the amount of additional holding torque that is applied, holding referring to the role of this additional torque in helping a driver hold the wheel during cornering.

Whenever the steering is held still or moves back towards centre, the second processing circuit will continue to apply the additional torque boost according to the mapping represented by the dotted line 15. If it stops moving back and starts to move away from centre then the second processing circuit will gradually stop applying the additional torque boost and instead follow the solid line 16.

The transition from the solid line to the dotted line, i.e. from zero offset torque to the mapped offset torque, comprises a linear change in offset torque with steering angle. The second processing means will generally ramp up the offset as the steering moves back towards centre and will generally ramp it down as the steering moves away from centre. Equal and opposite rates of change may be applied in each case. The ramp will continue as the angle changes until the torque becomes zero (movement away from centre) or meets the mapped offset torque (movement towards centre).

Typically the rate of increase/reduction will be chosen so that the complete transition occurs in around 1 or 2 degrees of steering column angle change for any given point in the map.

Figure 8:
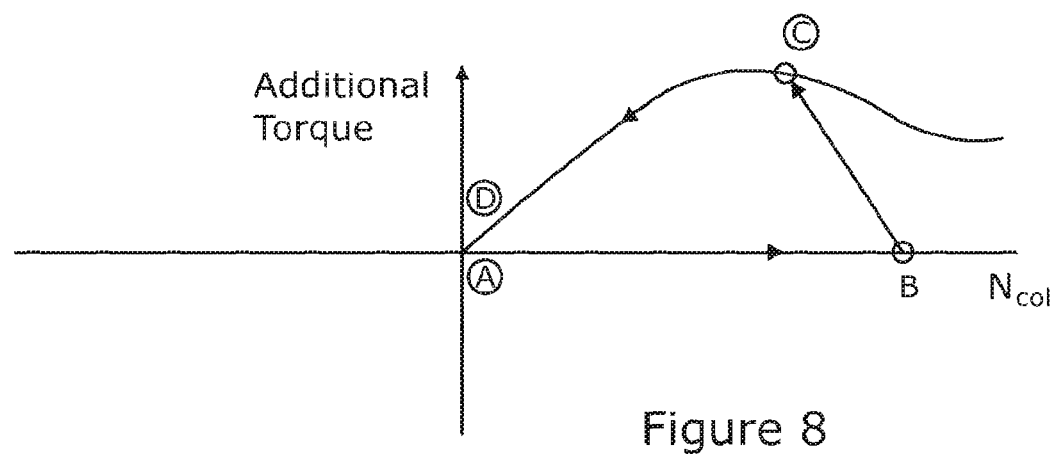
FIG. 8 shows the variation of additional holding torque applied during use of the vehicle in a typical cornering manoeuvre.
Figure 9:
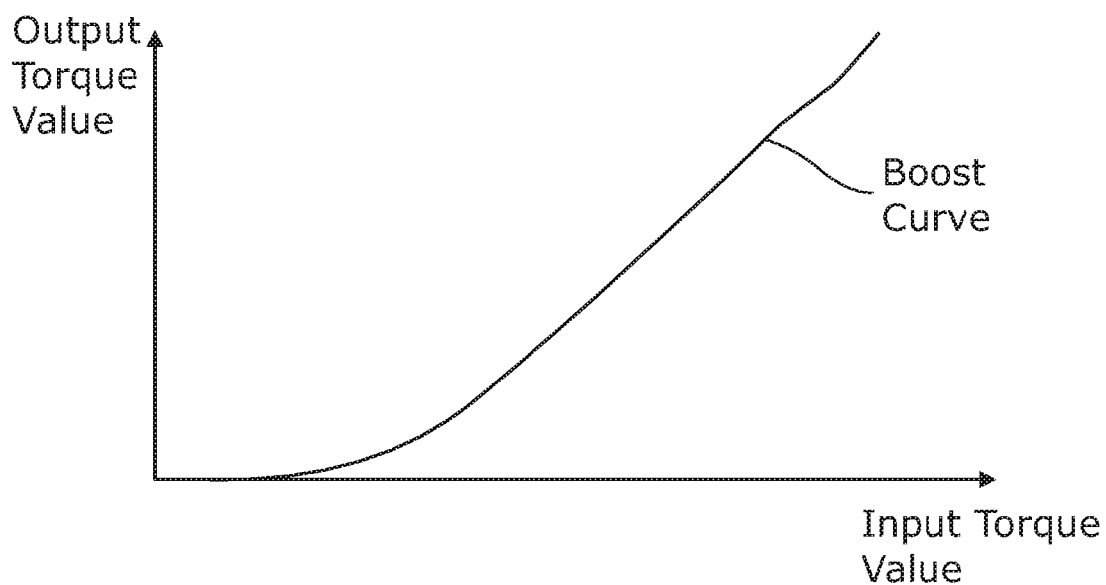
FIG. 9 illustrates a typical boost curve applied by the first processing circuit in any of the embodiments of FIGS. 3 to 5.

FIG. 8 shows the apparatus in use. In a first period of time the driver applies an increasing torque that moves the steering away from a centre position. This is represented by line A-B in Figure. At this time, the second signal processing circuit applies no boost to the input signal. Then, once settled into the corner the driver moves the wheel slightly back towards the centre. This is often a very small movement of no more than 1 degree or so of column rotation. The second signal processing circuit detects this movement, and applies a transition torque boost along the line B-C, increasing the torque in a linear fashion proportional to the change in steering angle. After the transition, the additional torque is applied following the mapping set by the second signal processing circuit and as the steering moves back towards centre the torque boost follows the line C-D/A.

Figure 4:
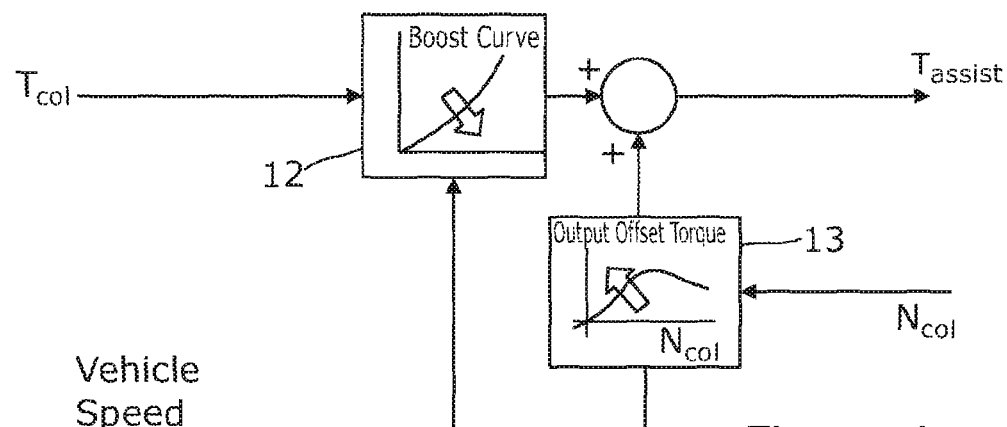
FIG. 4 is a block diagram illustrating the functional steps undertaken by an alternative embodiment of a steering assembly in accordance with the first aspect of the invention.
Figure 7:
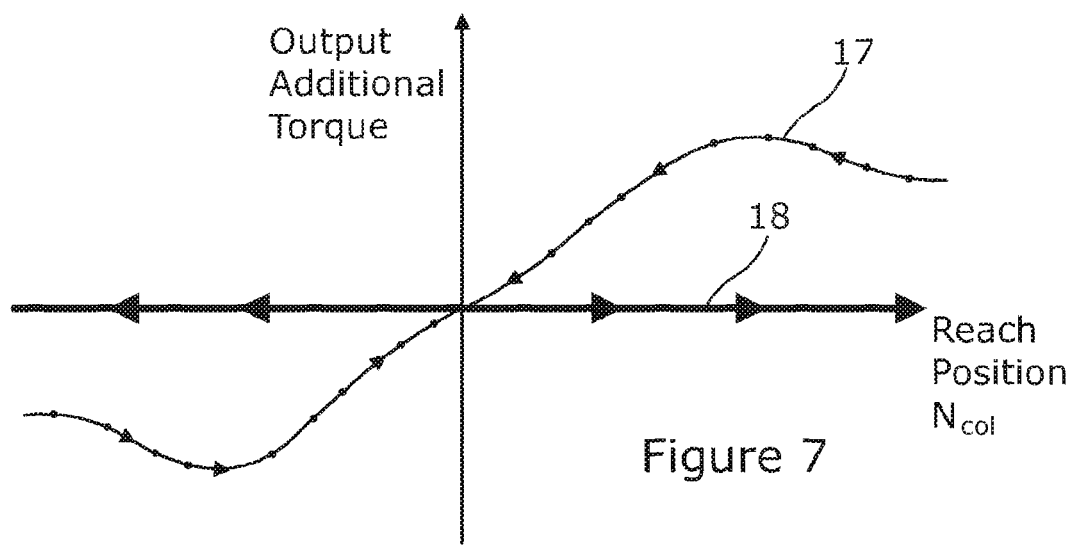
FIG. 7 is a map showing the relationship between the amount of additional offset torque applied to the output signal from the boost curve as the steering moves away from centre (solid line) and as it moves back to centre following an initial movement away (dotted line) for the embodiments of FIGS. 4 and 5.

A second embodiment is shown in FIG. 4. In this arrangement the second processing circuit 13 does not apply additional torque to the input to the boost curve. Instead, it applies an additional torque boost to the output of the first processing circuit 12, increasing the intermediate assistance torque value. The function of the second processing means is essentially the same as in the first embodiment apart from the boost being applied after the boost curve rather than before. A typical mapping of additional torque varying with column position Ncol is shown in FIG. 7 for movement away from the centre (the solid line 18) and back to centre (dotted line 17).

Figure 5:
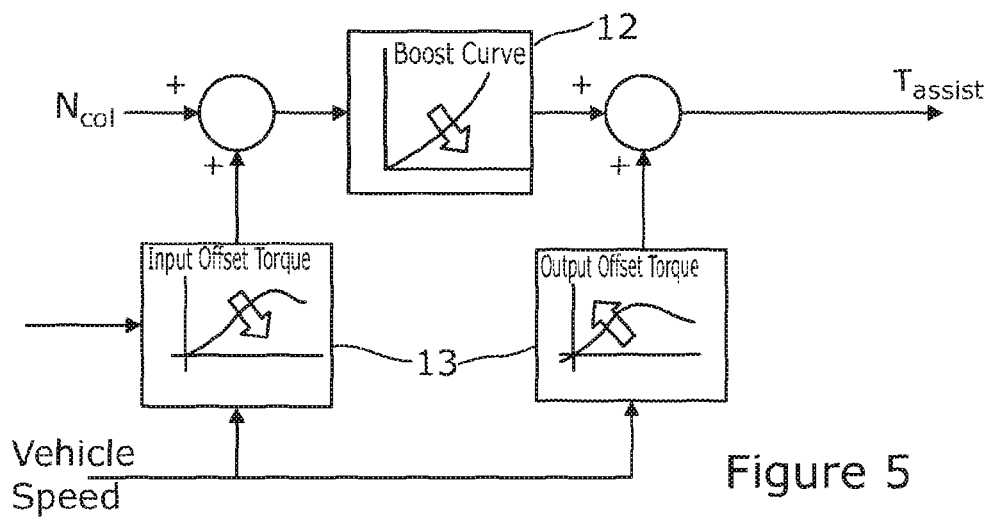
FIG. 5 is a block diagram illustrating the functional steps undertaken by a still further alternative embodiment of a steering assembly in accordance with the first aspect of the invention.

In a third embodiment shown in FIG. 5, the second processing circuit 13 boosts the input signal and also boosts the output from the boost curve of the first signal processing circuit 12. The amount by which it boosts the input and the output of the boost curve is made dependent on the vehicle speed. At low vehicle speeds, the overall boost that is applied is achieved predominantly by boosting the input signal with little or no boosting of the output signal. At higher vehicle speeds the boosting is applied predominantly by boosting the output signal of the boost curve with little or no boosting of the input signal. Between these higher and lower speeds the proportions of boost applied to the input and output will vary between these boundaries.

This change in the mapping values is represented by the block arrow on the map, showing the direction of movement of the mapped values as a function of vehicle speed. Generally the whole curve will be moved up or down as required, the offset following the path of the modified curve as the steering moves back towards the centre. Also shown in FIG. 5 is a variation in the boost curve with vehicle speed, again represented by a block arrow.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

The invention claimed is:

1. An electric power assisted steering apparatus comprising a steering mechanism which operatively connects a steering wheel to road wheels of a vehicle, the steering wheel having a centre position corresponding to a movement of the vehicle straight ahead, an electric motor operatively connected to the steering mechanism; a torque signal generator adapted to produce a torque signal indicative of the torque carried by a portion of the steering mechanism, a column position signal generator for producing a column position signal indicative of an angular position of the steering wheel or steering column and a signal processing unit adapted to receive the column position signal produced by the column position signal generator and to produce therefrom a torque demand signal representative of a torque to be applied to the steering mechanism by the motor, in which the signal processing unit includes:

a first signal processing circuit which receives an input signal dependent on the torque signal and outputs an assistance torque signal, the relationship between the input and the output of the first signal processing circuit being defined by a boost curve, a second signal processing circuit which in use applies an additional offset torque to at least one of the input signal and the output signal of the first processing circuit in the event that the steering wheel of the vehicle is moving back towards the centre position following a period of movement of the steering wheel away from the centre position, the additional offset torque being reduced or not being applied in the event that the steering wheel moves away from the centre position; and a torque demand signal generating circuit adapted to produce the torque demand signal from the assistance torque signal.

2. The electric power assisted steering apparatus according to claim 1 in which the signal processing unit is adapted to detect a transition from the steering moving back towards centre to moving away from centre and upon detection to reduce the offset torque as the steering moves away from centre until it reaches zero, thereafter applying zero offset torque as the steering moves further from centre.

3. The electric power assisted steering apparatus according to claim 1 in which the signal processing unit is adapted to detect a transition from the steering moving away from the centre to moving back towards the centre, and upon detection to increase the offset torque linearly as the steering moves back towards the centre until it reaches a mapped offset torque value, thereafter following the torque map as the steering moves further back towards the centre.

4. The electric power assisted steering apparatus according to claim 1 in which the signal processing unit detects a change in direction of movement of the steering by storing values of steering position at defined time intervals and comparing a current value with a previous value.

5. The electric power assisted steering apparatus according to claim 1 in which the first signal processing circuit uses a boost curve which comprises a mapping of desired assistance torque against input signal value, the gain increasing linearly, or non-linearly, with an increase in input signal value and in which the input signal to the boost curve comprises the column torque or the column torque plus the additional torque amount value where appropriate.

6. The electric power assisted steering apparatus according to claim 1 in which the second processing circuit is adapted to apply an amount of offset torque to the input signal only, or the output signal only, or to both input and output signal, and in each case the amount applied is a function of a value of the angular position signal.

7. The electric power assisted steering apparatus according to claim 6 in which the offset torque is applied to the boost curve input signal and output signal and the amount of additional torque applied to each is scheduled so that at low vehicle speeds relatively more offset torque is applied to the input signal and less of the output to achieve a given increase in the assistance torque, and at higher speed relatively more offset torque is added to the output and less to the input to achieve the same given increase in the assistance torque.

8. The electric power assisted steering apparatus according to claim 1 in which the second processing circuit determines the magnitude of the additional offset torque to be added to the input or output of the boost curve according to a predefined map of steering angular position against offset torque.

9. A method of operating an electric power assisted steering system, the method comprising the steps of:
generating a torque signal indicative of a torque carried by a portion of a steering mechanism,
generating a column position signal indicative of an angular position of a steering wheel or steering column,
producing from the signals an assistance torque signal that comprises a component part of a torque demand signal representative of a torque to be applied to the steering mechanism by a motor by the steps of:
processing an input signal dependent on the torque signal using a boost curve which defines a relationship between an input signal and an output signal; and
applying an additional offset torque to at least one of the input signal and the output signal in the event that the steering wheel of the vehicle is moving back towards a centre position following a period of movement of the steering wheel away from the centre position, the additional offset torque being reduced or not applied in the event that the steering wheel subsequently starts to move away from the centre position.

10. The method of claim 9 which comprises applying an offset torque to both the input signal and to the output signal.

* * * * *